United States Patent [19]

Campbell et al.

[11] Patent Number: 4,471,105

[45] Date of Patent: Sep. 11, 1984

[54] INTERFACIAL POLYCONDENSATION POLYCARBONATE PROCESS WITH QUATERNARY PHOSPHONIUM AMINO HALIDE CATALYST

[75] Inventors: John R. Campbell, Clifton Park, N.Y.; James W. Thackeray, Somerville, Mass.

[73] Assignee: General Electric Company, Schenectady, N.Y.

[21] Appl. No.: 463,205

[22] Filed: Feb. 2, 1983

Related U.S. Application Data

[63] Continuation-in-part of Ser. No. 253,447, Apr. 13, 1981, abandoned, and Ser. No. 254,814, Apr. 16, 1981, abandoned.

[51] Int. Cl.$^3$ .............................................. C08G 63/62
[52] U.S. Cl. ................................... 528/199; 528/126; 528/171; 528/196; 528/198

[58] Field of Search ............... 528/199, 198, 196, 126, 528/171

[56] References Cited

U.S. PATENT DOCUMENTS

| | | | |
|---|---|---|---|
| 3,227,681 | 1/1966 | Conix | 260/33.6 R |
| 3,275,601 | 9/1966 | Schnell et al. | 528/199 |
| 3,879,347 | 4/1975 | Serini et al. | 528/196 |
| 3,879,348 | 4/1975 | Serini et al. | 528/196 |
| 4,384,108 | 5/1983 | Campbell et al. | 528/199 |

Primary Examiner—Harold D. Anderson
Attorney, Agent, or Firm—William A. Teoli; James C. Davis, Jr.; James Magee, Jr.

[57] ABSTRACT

This invention relates to an improved interfacial polycondensation polycarbonate process wherein a dihydric phenol is reacted with a carbonyl halide in the presence of a quaternary-phosphonium amino halide catalyst.

3 Claims, No Drawings

INTERFACIAL POLYCONDENSATION POLYCARBONATE PROCESS WITH QUATERNARY PHOSPHONIUM AMINO HALIDE CATALYST

CROSS REFERENCE TO RELATED APPLICATIONS

This application is a continuation-in-part of Ser. No. 253,447, filed Apr. 13, 1981 and Ser. No. 254,814, filed Apr. 16, 1981, both now abandoned, where both of these applications are assigned to the same assignee as the present invention and incorporated herein by reference.

BACKGROUND OF THE INVENTION

1. Field of the Invention

This invention relates to an improved interfacial polycondensation process of preparing a polycarbonate by reacting a dihydric phenol, which may be sterically hindered, with a carbonyl halide in the presence of a polycondensation catalyst, the improvement wherein the catalyst is a quaternary-phosphonium amino halide catalyst.

2. Description of the Prior Publications and/or Art

In general, interfacial polycondensation publications including "The Encyclopedia of Polymer Science, Vol. 10 (1969), "Chemistry and Physics of Polycarbonates, Polymer Reviews," H. Schnell, Vol. 9, John Wiley & Sons, Inc. (1964); "Polycarbonates," Christopher N. Fox, Rheinhold Corporation of New York, (1962); among other publications, including numerous and foreign patents, e.g., U.S. Pat. Nos. 3,227,681; 3,275,601; 3,789,347; 3,879,345; and West German Offenlegungsschrift No. 29 01 668, report that generally effective polycondensation catalysts comprise tertiary amines or quaternary organic bases or salts thereof e.g., triethylamine, pyridine, tribenzylammonium chloride, etc., among others.

Some of the benefits associated with the process of the present invention include (1) the use of substantially reduced amounts of polycondensation catalyst to effect interfacial polycondensation, (2) the formation of polycarbonates having an improved $M_w/M_n$ value, the ability to recycle the polycondensation catalyst, and reduced carbonyl halide requirements for making sterically hindered polycarbonates.

3. Description of the Invention

The present invention embodies an improved interfacial polycondensation process for the preparation of aromatic polycarbonate by reacting dihydric phenol with carbonyl halide in the presence of a quaternary-phosphonium amino halide polycondensation catalyst.

The expression "quaternary-phosphonium amino halide" as employed herein and in the claims (hereinafter also referred to as "aminoalkyl tri-substituted phosphonium compounds") includes, among others, any quaternary phosphonium compound having the structural formula:

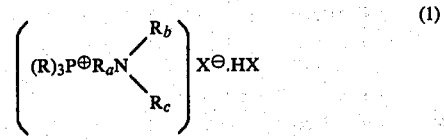

wherein independently each R is an alkyl, cycloalkyl or aryl group, $R_a$ is a divalent alkylene including cycloalkylene groups, X is a halogen radical and $R_b$ and $R_c$ are selected from the same or different alkyl or cycloalkyl groups.

Among the "quaternary-phosphonium amino halides" of the present invention are compounds which contain R, $R_a$ and $R_b$ as defined above.

Radicals included by R of formula (1) are a $C_{1-10}$ alkyl, $C_{4-10}$ cycloalkyl, or $C_{6-10}$ aryl group, including mixtures thereof; $R_a$ is a $C_{3-12}$ alkylene or $C_{4-12}$ cycloalkylene group, including mixtures thereof; $R_b$ is a $C_{1-10}$ alkyl or $C_{4-10}$ cycloalkyl group, including mixtures thereof; and $R_c$ is a $C_{1-10}$ alkyl or $C_{4-10}$ cycloalkyl group, including mixtures thereof.

Included in the quaternary-phosphonium amino halide salts of formula (I) are, for example, the following:

- (3-dimethylaminopropyl)triphenylphosphonium bromide hydrobromide,
- (3-diethylaminopropyl)triphenylphosphonium bromide hydrobromide,
- (4-didecylaminocyclohexyl)tributylphosphonium chloride hydrochloride,
- (5-dioctylaminopentyl)diphenylphosphonium chloride hydrochloride,
- (10-dimethylaminodecyl)phenyldibutylphosphonium bromide hydrobromide,
- (3-methylethylaminopropyl)tributylphosphonium bromide hydrobromide,
- (4-methylbutylaminobutyl)tributylphosphonium bromide hydrobromide, and
- (7-cyclohexylpropylaminoheptyl)triphenylphosphonium iodide hydroiodide, etc.

The quaternary-phosphonium amino halides, hereafter for brevity also referred to as (Q-PAH) can be prepared by any method well known to those skilled in the art including the methods referenced in Great Britain No. 1,085,406. In general, a presently preferred method comprises the reaction of an $\alpha,\omega$-dihaloalkane with a tri-substituted phosphine to form a tetra-substituted phosphonium halide, which is subsequently reacted with an aliphatic secondary amine to form the desired catalyst species, i.e., an ($\omega$-dialkylaminoalkyl)trisubstituted phosphonium compound.

The dihydric phenols used in the practice of the invention are well known to those skilled in the art as illustrated by D. W. Fox's U.S. Pat. No. 3,153,008 and can be illustrated by formula (2) set out hereafter:

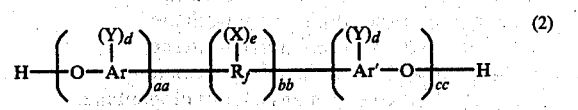

where $R_f$ is an alkylene, alkylidene including "vinylidene," cycloalkylene, cycloalkylidene or arylene linkages or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, each d represents a whole number from 0 up to a maximum equivalent to the number of replaceable hydrogens substituted on the aromatic rings comprising Ar or Ar', subject to the proviso that when d is equal to two or more, no more than one Y group is ortho-positioned relative to an —OH group, X is bromine, chlorine or a monovalent hydrocarbon group selected from the class consisting of alkyl, aryl and cycloalkyl including mixtures thereof, e represents a whole number of from 0 to a maximum controlled by the number of replaceable hydrogens on $R_f$, aa, bb and cc represent whole numbers including 0, when bb is not zero, neither aa or cc may be zero, otherwise either aa or cc but not both may be 0, when bb is zero, the aromatic groups can be joined by a direct carbon bond. As utilized hereinafter, the term "sterically hindered bisphenol" or "sterically hindered dihydric phenol" preferably means dihydric within the scope of (2), where Y is a monovalent alkyl or alkoxy group, d represents a whole number up to a maximum equivalent to the number of replaceable hydrogens substituted on the aromatic rings comprising Ar or Ar' subject to the proviso that at least two Y groups are ortho positioned relative to each —OH group of each arene radical.

Sterically-hindered aromatic polycarbonate is shown as follows:

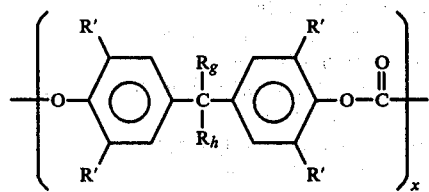

(3)

and

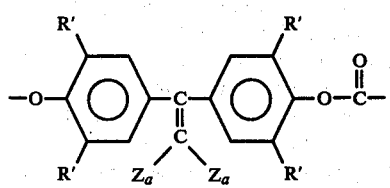

(4)

where independently each R' is a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine, and x is a positive integer having a value greater than 1.

Some of the dihydric phenols of formula (2) are, for example, resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-diphenyl-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2,4-dichlorophenyl methane;
4,4'-dihydroxy-diphenyl-p-isopropylphenyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4'-dihydroxy-diphenyl-2,2-(4-methyl pentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4,4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-2-naphthylmethyl methane;
4,4'-dihydroxy-tetraphenyl methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-biphenyl;
α,α,α',α'-tetramethyl-α,α'-di(p-hydroxyphenyl)-p-xylylene;
α,α,α',α'-tetramethyl-α,α'-di(p-hydroxyphenyl)-m-xylylene;
4,4'-dihydroxy-3,3'-dimethyl-diphenyl methane;
4,4'-dihydroxy-2,2'-dimethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5-tetramethyl-diphenyl methane;
4,4'-dihydroxy-2,2'-dimethyl-5,5-diisopropyldiphenyl methane;
4,4'-dihydroxy-2,2'-dimethyl-5,5'-dipropyl-diphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-diphenyl-4,4-hexanone-3;
4,4'-dihydroxy-diphenylmethyl-4-methoxy-phenyl methane;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
2,2-bis(4-hydroxy-phenyl)-1-chloroethylene;
2,2-bis(4-hydroxy-phenyl)-1,1-dichloroethylene; and
2,2-bis(4-hydroxy-phenyl)-1,1-dibromoethylene, etc.

Some of the sterically hindered dihydric phenols employed in the practice of the invention are as follows:
1,1-bis(4-hydroxy-3,5-dimethylphenyl)methane;
2,4'-dihydroxy-3,3',5,5'-tetramethylphenyl methane;
1,1-bis(3,5-diethyl-4-hydroxyphenyl)methane;
1,1-bis(3,5-diisopropyl-4-hydroxyphenyl)methane;
1,1-bis(3,5-dibromo-4-hydroxyphenyl)methane;
1,1-bis(3,5-dimethyl-4-hydroxyphenyl)ethane;
1,1-bis(3-methyl-5-ethyl-4-hydroxyphenyl)ethane;
1,1-bis(3,5-diethyl-4-hydroxyphenyl)ethane;
2,2-bis(3-methyl-5-ethyl-4-hydroxyphenyl)propane;
2,2-bis(3,5-dibromo-4-hydroxyphenyl)propane;
2,2-bis(3,5-diisopropyl-4-hydroxyphenyl)propane;
2,2-bis(4-hydroxy-3,5-dimethylphenyl)propane;
2,2-bis(3,5-dibromo-4-hydroxyphenyl)butane;
2,4'-dihydroxy-3,3',5,5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2'-bis(3,5-dimethyl-4-hydroxyphenyl)-1-chloroethylene;

2,2'-bis(3,5-dimethyl-4-hydroxyphenyl)-1,1-dichloro-
ethylene; and 2,2'-bis(3,5-dibutoxy-4-hydroxyphenyl)-1,1-
dibromomethylene; etc.

The expression "carbonyl halides" as employed herein and in the claims includes carbonyldichloride, more commonly known as phosgene, carbonyl dibromide, carbonyl diiodide, carbonyl difluoride, carbonylchlorofluoride, including mixtures thereof.

Some of the aromatic polycarbonates prepared by the process of this invention can be illustrated as follows:

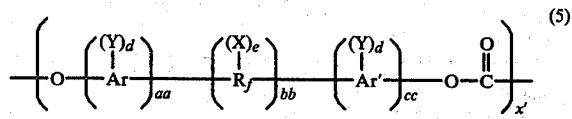

wherein $R_f$, Ar, Ar', Y, X, d, e, aa, bb, and cc are as defined above and x' is a number of at least 2, preferably from 30 to 200 or higher, and often more preferably from 40 to 100.

The preferred aromatic polycarbonate are as follows:

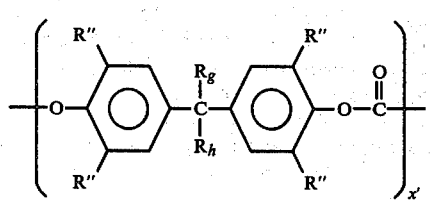

and

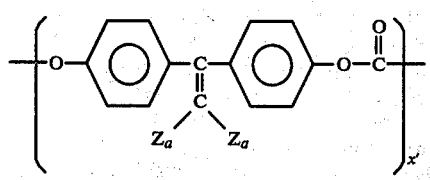

where independently each R" is hydrogen, bromine, chlorine or a $C_{1-4}$ alkyl or alkoxy group, $R_g$ and $R_h$ are hydrogen or a $C_{1-2}$ alkyl group, and $Z_a$ and x' are as previously defined.

There is provided by the present invention, a process of preparing aromatic polycarbonates which comprises (1) introducing a carbonyl halide into agitated plural-phase mixture comprising a dihydric phenol, an inert organic solvent, water alkali metal hydroxide and a quaternary phosphonium amino halide, where there is utilized from 0.05 to 3% by weight of the quaternary phosphonium amino halide, based on the weight of the dihydric phenol and sufficient alkali metal hydroxide to provide a pH of at least 10 in the resulting mixture and (2) recovering aromatic polycarbonate from the resulting mixture of (1).

The process parameter related to pH is maintained throughout the course of the reaction, by any means, such as, optionally, by the initial addition of large excesses of alkali metal hydroxide including the substantially continuous addition of alkali metal hydroxide during the course of the reaction, e.g., concurrently with the carbonyl halide addition.

Any inert solvent can be used including medium polar solvents such as chlorobenzene, bromobenzene, orthodichlorobenzene, methylene chloride, 1,2-dichloroethane, iodobenzene, etc. and mixtures thereof. Preferably, the solvents employed are halogenated hydrocarbons, more preferably methylene chloride.

The interfacial polycondensation is carried out in any strongly basic reaction medium, i.e., pH 10 or higher, provided by the presence of a strong inorganic base, including mixtures thereof. Representative of basic species which can be employed are the following: basic quaternary ammonium, quaternary phosphonium or tertiary sulfonium hydroxide; alkali metal hydroxides; etc. Specific examples are tetramethyl ammonium hydroxide, tetraethyl phosphonium hydroxide, etc.; the lithium, sodium and potassium hydroxides; etc. Especially preferred are sodium or potassium hydroxide.

The amount of dihydric phenol and carbonyl halide which can be employed in the interfacial polycondensation reaction is not critical, subject to the proviso that the carbonyl halide is present in stoichiometric amounts at least sufficient to react with the hydroxy groups associated with the dihydric phenol. Preferably, the carbonyl halide is present in excess, i.e., in amounts of at least about 1.25 to 1.5 times the stoichiometric amounts required to completely couple all of the reactive dihydric phenol to form the desired aromatic polycarbonate.

Any amount of base can be employed subject to the proviso that the agitated two-phase mixture is maintained at a pH value in excess of about 10, preferably within the range of 10–12, an optionally, as high as 14. Generally effective mol proportions of base relative to the hydroxyl groups associated with the dihydric phenol are within the range of from about 2:1 to 5:1 and frequently preferably from about 2.1:1 to 3.1.

The amount of quaternary phosphonium amino halide catalyst which can be employed is not critical however, generally effective mol proportions relative to the dihydric phenol are within the range from about 0.025% to about 3.0% and preferably within the range of from about 0.05% to about 1.0% per mole of dihydric phenol.

The aromatic polycarbonate derived from the process of the present invention, preferably, exhibit an intrinsic viscosity of at least 0.3, and more preferably about 0.5 deciliters per gram (dl/g) as measured in either methylene chloride or chloroform or a similar solvent system at 25° C. The upper intrinsic viscosity number is not critical, however, and will generally be about 1.5 dl/g. Especially useful polycarbonates generally have intrinsic viscosities within the range of from about 0.38 to about 0.7 dl/g. Preferably, the polycarbonates have a number average molecular weight of at least about 5000, and more preferably from about 10,000 to about 50,000 or higher. Polycarbonates of such molecular weight characteristics process easily in between about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

The following examples are set forth to illustrate the practice of the invention and not for purposes of limitation. All parts are by weight.

EXAMPLE 1

Into a one-liter 3-necked flask equipped with stirrer, condenser, addition funnel, and thermometer there was charged 500 ml xylene and 100 g. triphenylphosphine. There was slowly added 77 grams of 1,3-dibromopropane to the stirred solution at 130° C. After heating for 20 hours at 130° C., the resulting suspension was cooled and filtered to give 131.2 g of (3-bromopropyl)triphenylphosphonium bromide (M.P. 229°-30° C.).

Into a one-liter 3-necked flask equipped with stirrer, condenser, addition funnel, and thermometer here was charged, 200 g of the above (3-brompropyl)triphenylphosphonium bromide, and 650 ml ethanol. There was then added dropwise, 240 ml of diethylamine at 50° C. with stirring. After 18 hours at 65° C., the solution was concentrated to an oil and the residue was redissolved in 500 ml ethanol. The solution was again concentrated to a solid. The resulting brown solid was slurried in 500 ml of hot tetrahydrofuran and filtered. The crystal were recrystallized from tetrahydrofuran containing a small amount of ethanol to give 230 g of (3-diethylaminopropyl)triphenylphosphonium bromide hydrobromide (M.P. 239°-241° C.).

A series of aromatic polycarbonates were prepared according to the following procedure as shown by Run No. 1 further described in Table I below.

A 250 ml flask equipped with a mechanical stirrer, pH electrode, condenser having a nitrogen feed, a caustic aqueous sodium hydroxide addition funnel, and a phosgene inlet tube was flushed with nitrogen and charged with 27.5 ml of deionized water, 32.6 ml of methylene chloride, 14.6 g of bis(4-hydroxyphenyl) propane-2,2, i.e., bisphenol-A also referred to herein as "BPA", 4.2 ml of a 5% (w/v) solution of phenol in methylene chloride, and 0.113 g (0.33 mol%) of 3-diethylaminopropyl)-triphenylphosphonium bromide hydrobromide i.e., hereafter referred to as "ATPB", present in an amount equal to 0.33 mol percent based on the moles of BPA charged to the flask. Sufficient amount of 50% (w/v) of an aqueous sodium hydroxide solution was added during continuous agitation of the reaction ingredients to maintain under equilibrium conditions a relatively constant pH value of 11. Phosgene was introduced from a calibrated flow meter at 0.4 g per minute while maintaining a pH of 11 by the dropwise addition of a 50% sodium hydroxide solution. After 22 minutes the phosgene flow was stopped and the high molecular weight bisphenol-A polycarbonate polymer solution was diluted with 150 ml of methylene chloride and the organic layer separated. The organic layer was washed with a dilute hydrochloric acid (150 ml of a 25 w/v solution) and 150 ml of deionized water. The resulting solution was dried over anhydrous mangesium sulfate, and subsequently filtered. A film of polymer was cast by evaporating the solvent. The polycarbonate film was dried at 50° C. and characterized by gel permeation chromatography. The polymer had an intrinsic viscosity [η] of 0.51 dl/g measured in chloroform at 25° C. The GPC analysis was performed at a flow of 2.0 ml per minute of chloroform using a series of $10^5$, $10^4$, $10^3$ and 500 (Å) microstyragel columns calibrated against a polystyrene standard.

Some of the reaction parameters and product properties are set out in Table I.

TABLE I

| Run No. | REACTION PARAMETERS Catalyst Type | Mol % | POLYMER PROPERTIES I.V. [η] | GPC DATA Mw | Mn | Mw/Mn |
|---|---|---|---|---|---|---|
| 1 | ATPB | 0.33 | 0.51 | 42,000 | 14,141 | 2.97 |
| 2 | " | 0.22 | 0.51 | 42,200 | 13,701 | 3.08 |
| 3 | " | 0.165 | 0.55 | 44,700 | 19,267 | 2.32 |
| 4 | ATPB[1] | 0.16 | 0.56 | 44,600 | 17,598 | 2.54 |
| 5 | ATPB | 0.10 | 0.537 | 45,600 | 16,765 | 2.72 |
| 6 | " | 0.019 | 0.53[3] | — | — | — |
| 7 | " | 0.010 | 0.44 | — | — | — |
| 8 | TEA[2] | 1.0 | 0.525 | 42,600 | 15,269 | 2.79 |
| 9 | " | 0.50 | 0.48 | 39,000 | 14,942 | 2.61 |
| 10 | " | 0.15 | 0.51 | — | — | — |
| 11 | " | 0.10 | 0.43 | — | — | — |

Footnote [1] Recycle ATPB - catalyst contained in acid washed aqueous phase, carefully separated from organic phase containing polycarbonate of Run No. 3, was used as catalyst for Run No. 4.
Footnote [2] TEA = Triethylamine.
Footnote [3] Properties of the polycarbonate were found to be substantially similar to polymer of runs 1–5.

The above results show that the use of a quaternary phosphonium amino halide catalyst in the two-phase polycondensation process of this invention provides advantages not associated with otherwise similar interfacial polycondensation processes which employ alkyl or aryl amines. For example, ATPB can be used at substantially reduced levels compared to amine catalysts for phosgenating bisphenols. The ATPB catalyst can be recycled and provide polycarbonates having a narrower molecular weight distribution compared to polycarbonates based on the use of an amine catalyst.

EXAMPLE 2

A series of sterically-hindered aromatic polycarbonates were prepared according to the following general procedure with respect to Run No. I, further described in Tables II and III below.

A flask equipped with a mechanical stirrer, pH electrode, condenser having a nitrogen feed, an addition funnel, a phosgene inlet tube was flushed with nitrogen and charged with 61 ml of deionized water, 32 ml of methylene chloride, 18.2 g of bis(4-hydroxy-3,5-dimethylphenyl)propane-2,2 i.e., tetramethyl bisphenol-A also referred to herein as "TMBPA", 0.209 g of 2,4,6-trimethyl phenol—a chain stopper present in an amount equal to 2.3 mol % based on mols of TMBPA charged to the flask, and 0.40 g of (3-diethylaminopropyl)triphenylphosphonium bromide hydrobromide, present in an amount equal to 1.16 mol % based on the mols of TMBPA and 2,4,6-trimethyl phenol charged to the flask. Sufficient amounts of 50% (w/v) of an aqueous sodium hydroxide solution was added during continuous agitation of the reaction ingredients to establish and maintain under equilibrium conditions a relatively constant pH value of about 13. Phosgene was introduced from a calibrated flow meter at 0.53 g per minute while maintaining a pH of 13 by the dropwise addition of a 50% aqueous sodium hydroxide solution. After 20 minutes the phosgene flow was stopped. The organic phase was separated and diluted with 100 ml of methylene chloride and washed twice with a dilute hydrochloric acid (100 ml of a 2% w/v solution) and twice with 100 ml of deionized water. The resulting polymer solution was added to methanol in a high speed blender, and the polymer precipitate was collected by filtration.

Reaction parameters and product properties, based on the use of ATPB of the present invention and triethylamine (TEA) of the prior art are shown in Table II.

TABLE II

| Run No. | Dihydric Phenol (g) | Catalyst Type | Mol % | COCl$_2$ Mol % | Chain Stopper Mol % | H$_2$O ml | CH$_2$Cl$_2$ ml | pH | I.V. [η] |
|---|---|---|---|---|---|---|---|---|---|
| I | TMBPA (18.2) | — | ATPB 1.16 | 165 | 2.3 | 61 | 32 | 13 | 0.60 |
| II | TMBPA (9.3) BPA (2.5) | ATPB | 1.0 | 160 | 2.3 | 45 | 32 | 13 | 0.54 |
| III | TMBPA (18.32)$^{(a)}$ | — | TEA 15.0 | 400 | 2.47 | 120$^{(a)}$ | 80$^{(a)}$ | 13 | 0.44 |
| IV | TMBPA (9.3) | — | TEA 10 | 160 | 2.3 | 45 | 32 | 13 | 0.23 |
| V | TMBPA (9.3) | — | TEA 10 | 380 | 2.3 | 45 | 32 | 13 | 0.54 |
| VI | TMBPA (9.3) | — | TEA 5 | 380 | 2.3 | 45 | 32 | 13 | 0.41 |

$^{(a)}$Run No. III values
(18.32)$^{(a)}$ = 1,832
(120)$^{(a)}$ = 12,000
(80)$^{(a)}$ = 8,000

As illustrated by Runs I and II versus Runs III–VI, the use of a quaternary phosphonium amino halide catalyst in the formation of sterically-hindered polycarbonates permits a significant reduction in the amount of carbonyl halide employed, e.g., phosgene, i.e., by as much as 60% of that normally employed when amines are used to promote the reactions in the formation of polycarbonates. The reduction in the amount of carbonyl halide used in this process reduces significantly the amount of sodium chloride brine which is necessarily reprocessed per pound of polycarbonate formed in commercial practice.

EXAMPLE 3

Another series of sterically-hindered aromatic polycarbonates were prepared according to the detailed procedure set out in Example 2 with the exception that dihydric phenols other than TMBPA and BPA were employed.

The dihydric phenols employed were 1,1-bis(4-hydroxy-3,5-dimethylphenyl)sulfide also referred to herein as "TM-BPS", 1,1-bis(4-hydroxy-3,5-dimethylphenyl)methane also referred to herein as "TM-BPM," and 2,2-bis(4-hydroxy-3,5-diisopropylphenyl)propane also referred to herein as "IP-BPA". The GPC analysis was performed at a flow of 2.0 ml per minute of chloroform using a series of 10$^5$, 10$^4$, 10$^3$ and 500 (A) microstyragel columns calibrated against a polystyrene standard.

A series reaction parameters and product properties are shown out in Tables III and V. The runs were carried out in a manner similar to EXAMPLE 2.

EXAMPLE 4

In order to further demonstrate the advantages of using the quaternary phosphonium amino halides of formula (1) as a polycarbonate polymerization catalyst, 3-diethylaminopropyltriphenylphosphonium hydrobromide, a modified phase transfer catalyst, was used in a phosgenation mixture with bisphenol-A. The following procedure was employed:

Phosgene was introduced at a rate of about 0.4 grams per minute over a 22 minute period into a vigorously stirred mixture maintained at a pH of 11 with aqueous sodium hydroxide consisting of 14.6 grams of bisphenol-A, 390 grams of methylene chloride, about 290 grams of water, 0.211 gram of phenol and 0.055 gram (0.165 mole percent based on bisphenol-A of diethylaminopropyltriphenylphosphonium hydrobromide as a modified phase transfer catalyst.

The reaction mixture was allowed to separate into two phases and the organic layer carefully extracted with a solution of 2 ml of concentrated hydrochloric acid in 25 ml of water. The aqueous extract was analyzed spectrophotometically and found to contain greater than 85% by weight of the aforementioned modified phase transfer catalyst of the present invention. The organic layer was then washed with water and the polymer isolated by adding the organic solution to 5 volumes of methanol in a blender. The polycarbonate was precipitated and it was collected and dried. It was found to have an Izod impact (ft-lb/in) of greater than 16.

The original aqueous layer containing the modified

TABLE III

REACTION AND PRODUCT PARAMETERS

| Run No. | Dihydric Phenol (g) | Catalyst Type | Mol % | COCl$_2$ Mol % | Chain Stopper Mol % | H$_2$O ml | CH$_2$Cl$_2$ ml | pH | I.V. [η] | GPC Mw |
|---|---|---|---|---|---|---|---|---|---|---|
| VII | TMBPS (12.1) | ATPB | 2.2 | 130 | 2.3 | 47 | 50 | 13 | 0.50 | 60,000 |
| VIII | TMBPM (16.4) | ATPB | 1.1 | 150 | 2.3 | 61 | 32 | 13 | 0.51 | — |
| IX | IPBPA (6.2) | ATPB | 2.0 | 200 | None | 30 | 16 | cal4 | 0.50 | 63,000 |
| X | TMPBM (16.4) | TEA | 15 | 400 | 2.3 | 61 | 32 | 13 | 0.51 | 45,000 |
| XI | IPBPA (6.2) | TEA | 15 | 400 | None | 30 | 16 | 13 | <0.1 | 1,500 |

The above results show that the use of a quaternary phosphonium amino halide catalyst in a two-phase polycondensation process provides advantages not associated with otherwise similar interfacial polycondensation processes using alkyl or aryl amines. For example, ATPB allows a significant reduction in the amount of phosgene used, when contrasted with the amount of phosgene required when amine catalyst are employed in an otherwise similar aromatic polycarbonate process.

phase transfer catalyst of the present invention was then employed with additional BPA, methylene chloride and phenol in accordance with above phosgenation procedure to produce additional polycarbonate, which was found to have the same molecular weight and intrinsic viscosity of the initial polycarbonate described above.

The above procedure was repeated, except that tetrabutylphosphonium bromide (0.217 gram) was used in place of the modified phase transfer catalyst of the present invention. Analysis of the acid extract resulting from the treatment of the reaction mixture with aqueous hydrochloric acid showed that less than 5% by weight of the tetrabutylphosphonium bromide had been recovered in the aqueous layer. These results show that polymerization catalysts similar to the catalyst shown by Conix, U.S. Pat. No. 3,227,681, cannot be recycled and reused for making polycarbonate by phosgenating bisphenol-A.

In order to illustrate the adverse results which can be obtained when polymerization catalyst is retained by the polymer, phosgene was added at a rate of 35 grams per minute for 33 minutes to a vigorously stirred mixture consisting of tetrabutylphosphonium bromide, reaction pH of about 13 being maintained by addition of aqueous sodium hydroxide. The polymer solution was then separated and washed with dilute hydrochloric acid and water. The resulting polycarbonate was then isolated by steam precipitation and dried at 50° C. in a vacuum oven. The resulting polycarbonate had an intrinsic viscosity of 0.52 dl/g in chloroform at 25° C.

The dried powder was then extruded in a 1" Wayne extruder, the extrudate pelletized and the pellets injectionmolded into Izod test bars. The Izod impact values of the resulting test bars in accordance with standard ASTM procedures was found to be about 2 as compared to a value of 16 or more for commercial BPA polycarbonate.

It was further found that when commercial polycarbonate (I.V. 0.52 dl/g in chloroform at 25° C.) was dried blended with tetrabutylphosphonium bromide in the same weight proportions of polycarbonate to catalyst as described above (256:3.76), an Izod value of about 2 was obtained when the dry blended material was extruded and injection molded as described above.

EXAMPLE 5

Phosgene was added to a mixture at a rate of about 40 grams per minute while maintaining the reaction mixture at a pH of about 13 by use of a 50% aqueous sodium hydroxide solution to a vigorously stirred mixture consisting of 9.0 grams of 2,2-bis(4-hydroxy-3,5-dimethylphenylpropane), 31 ml of methylene chloride, 60 ml of water, 0.0793 gram of 2,4,6-trimethylphenol and 0.168 grams of catalyst.

The reaction was conducted in an inert atmosphere until a predetermined amount of phosgene was added. At the termination of the phosgenation, the reaction mixture was diluted with 100 ml of methylene chloride. The organic phase was separated, washed twice with 150 ml of a 1% aqueous hydrochloric acid and twice with 200 ml of deionized water. The organic phase was then added to methanol in a blender. The polycarbonate was collected and dried at 50° C. in a vacuum oven overnight.

The above procedure was repeated, except that in place of the diethylaminopropyltriphenylphosphonium hydrobromide catalyst of the present invention there was used tetrabutylphosphonium bromide. The following results were obtained with respect to the amount of phosgene used in the respective reactions and the resulting intrinsic viscosity of the polycarbonate obtained in these reactions.

TABLE 6

| Catalyst | Phosgene Consumed (mols) | Polycarbonate IV |
| --- | --- | --- |
| Tetrabutyl- phosphonium bromide | 2.0–3.0 | 0.25–0.4 |
| Diethylamino- propyltriphenyl- phosphonium bromide | 1.5 | 0.52–0.55 |

The above results show that the catalyst of the present invention provides higher molecular weight polymer for the same level of chain stopper as well as improved material usage with respect to the polymerization of sterically-hindered bisphenols to produce sterically-hindered polycarbonates.

Although the above examples are directed to only a few of the very many variables involved in the practice of the present invention, it should be understood that the present invention is directed to the polymerization of a much broader variety of bisphenols, including sterically-hindered bisphenols resulting in the production of a much broader variety of polycarbonates which include sterically-hindered polycarbonates. These examples demonstrate the advantages of the modified phase transfer catalyst used in the practice of the present invention with respect to catalyst recyclability, the production of high impact polycarbonates, improved material usage and the production of high molecular weight polycarbonates having better molecular weight control.

What we claim as new and desire to secure by Letters Patent of the United States is:

1. A process for preparing film forming polycarbonate comprising
   (1) agitating a mixture consisting of
      (i) an organic phase containing a sterically hindered aromatic dihydroxy compound, an inert solvent, and a quaternary phosphoniumaminohalide catalyst,
      (ii) an aqueous phase having a pH value of at least 10 and containing a solution of an alkali metal hydroxide,
   (2) adding carbonyl halide to the mixture of (1),
   (3) effecting reaction between the sterically hindered aromatic dihydroxy compound of (1) and the carbonyl halide,
   (4) recovering the resulting film forming aromatic polycarbonate.

2. A process in accordance with claim 1 where the sterically hindered aromatic dihydroxy compound is capable of providing sterically hindered aromatic polycarbonate having chemically combined units selected from

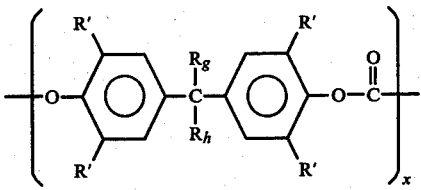

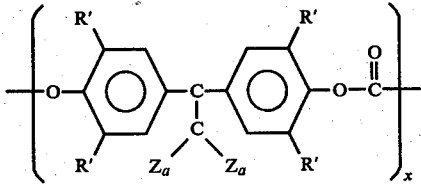

where independently each $R'$ is a $C_{1-4}$ alkyl or alkoxy group, $R_g$ and $R_h$ and hydrogen or a $C_{1-2}$ alkyl group, each $Z_a$ is hydrogen, chlorine and bromine, subject to the proviso that at least one $Z_a$ is chlorine or bromine, and x is a positive integer having a value greater than 1.

3. A process in accordance with claim 1 where the sterically hindered aromatic dihydroxy compound is bis(4-hydroxy-3,5-dimethylphenyl)propane-2,2.

* * * * *